(12) United States Patent
Mardirossian et al.

(10) Patent No.: US 6,263,142 B1
(45) Date of Patent: Jul. 17, 2001

(54) METHOD AND APPARATUS FOR SEPARATING OPTICAL FIBERS

(75) Inventors: Hovhannes Habib Mardirossian, Morris Plains; Robert C. Brockman, Jackson, both of NJ (US)

(73) Assignee: Tyco Submarine Systems, Ltd., Eatontown, NJ (US)

( * ) Notice: Subject to any disclaimer, the term of this patent is extended or adjusted under 35 U.S.C. 154(b) by 0 days.

(21) Appl. No.: 09/167,579

(22) Filed: Oct. 7, 1998

(51) Int. Cl.[7] ....................................................... G02B 6/02
(52) U.S. Cl. ............................ 385/135; 385/134; 242/118
(58) Field of Search ................................. 385/134, 135, 385/136, 137, 123; 361/826, 827, 828, 641, 644; 356/350; 242/118, 125, 125.1, 125.2, 159, 166, 169, 174, 176, 600, 601, 614

(56) References Cited

U.S. PATENT DOCUMENTS

| | | | |
|---|---|---|---|
| 5,323,479 | * | 6/1994 | Allen ........................................ 385/135 |
| 5,710,855 | * | 1/1998 | Konwitz ................................. 385/135 |
| 5,761,368 | * | 6/1998 | Arnett et al. ........................... 385/134 |
| 5,841,932 | * | 11/1998 | Page et al. ............................. 385/134 |

* cited by examiner

Primary Examiner—Hemang Sanghavi

(57) ABSTRACT

An apparatus and method are introduced for preventing a first optical fiber and a second optical fiber wound on the same spool from interfering from one another. The apparatus comprises an annulus having an inner edge, an outer edge, and an annular width consisting of the distance, measured radially, between the inner and outer edges. The inner edge of the annulus is sized to fit snugly in a coaxial fashion around the spool, and the annular width should be at least large enough to separate the first and second optical coil.

8 Claims, 3 Drawing Sheets

METHOD AND APPARATUS FOR SEPARATING OPTICAL FIBERS

FIELD OF THE INVENTION

The present invention relates to packaging optical fibers. In particular, the present invention relates to handling and storing optical fibers in a way that is intended to preserve their physical and optical characteristics.

BACKGROUND OF THE INVENTION

Optical fibers are stored in various ways for a variety of uses. For example, within a fiber-optic system element such as a repeater or branching unit, a typical circuit pack contains a fiber tray in which lengths of fiber are stored for use with certain electronic components. The fiber trays typically contain spools, some round, some not, around which some portion of the optical fibers are wrapped. Each fiber tray is capable of storing several different fibers on a spool. Multiple storage, however, creates the potential for several problems.

One such problem is fiber cross over. If different fibers are wound over each other, the outer fibers may bend in a way and to a degree that may damage the fiber or adversely affect the propagation characteristics of the fiber by mechanically stressing the fibers at the bend. This problem is exacerbated when the different fibers have different diameters.

To alleviate these problems, the inventors experimented with various techniques and materials. For example, rigid plastic was used to separate different fibers. The inventors found, however, that rigid plastic did not adequately alleviate the mechanical stresses associated with cross over. Another problem associated with the rigid plastic separators is that they are thick enough so as to occupy an unnecessarily large amount of space on the spool. Additionally, plastic can collect static electricity, detrimentally impacting on the fiber's performance.

The inventors also experimented with paper separators. Paper separators have the advantage of being thin and soft, but do not possess the strength necessary to withstand deformation or tearing.

SUMMARY OF THE INVENTION

To solve the problems posed by separating optical fibers, a separator is introduced that is sufficiently thin and strong, and that does not collect too much static electricity. The separator is designed to prevent a first optical fiber and a second optical fiber wound on the same spool from interfering with one another.

The separator comprises an annulus with an inner and outer diameter, and an annular width that is the difference between the inner and outer diameter, measured radially from some fixed point inside the inner diameter. The inner diameter is sized to fit snugly around the spool, and the annular width is large enough to separate the first and second optical fibers on the spool.

DETAILED DESCRIPTION

Embodiments of the present invention are directed to methods and apparatuses for separating optical fibers coiled on a spool located, for example, in a fiber tray.

Figure 1:
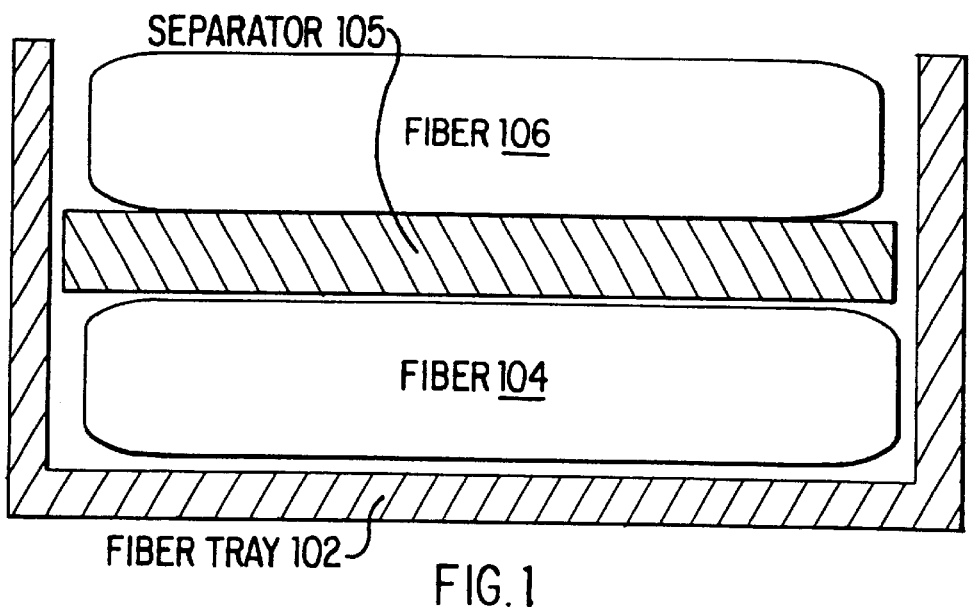
FIG. 1 illustrates a system overview of an embodiment of the present invention.
Figure 2:
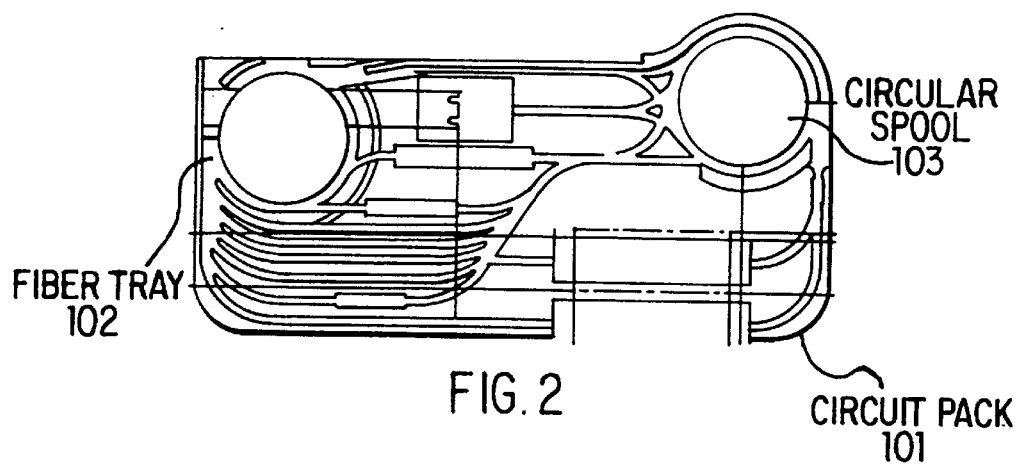
FIG. 2 illustrates another system overview of an embodiment of the present invention.
Figure 3:
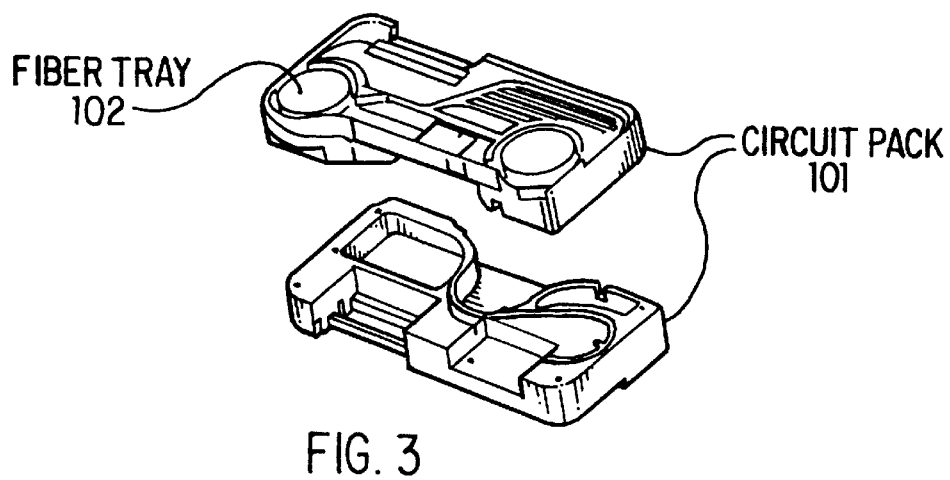
FIG. 3 illustrates another system overview of an embodiment of the present invention.

FIGS. 1, 2, and 3 are system overviews of an embodiment of the present invention. To give a proper context to the invention, circuit pack 101 is illustrated containing fiber tray 102. Inside fiber tray 102 is circular spool 103. A circular spool is illustrated for purposes of context only. For the purposes of the present invention, a "spool" can be circular, oblong or oval, or any shape around which an optical fiber can be wrapped. In this system overview, optical fibers 104 and 106 are wrapped around circular spool 103, and a separator is placed between fibers 104 and 106 is. Of course, any number of fibers can be stacked on a spool, provided they all fit on the spool, and provided they are properly separated by a separator.

Figure 4:
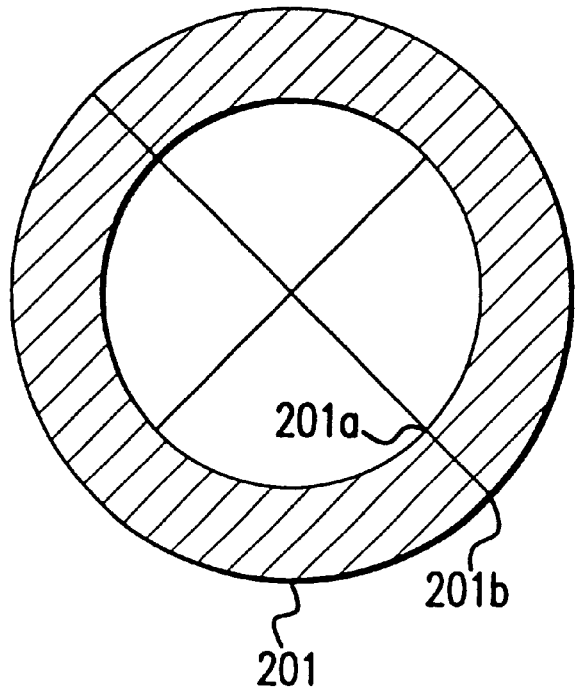
FIG. 4 illustrates a diagram of an apparatus of an embodiment of the present invention.

FIG. 4 is an illustration of an embodiment of the present invention. In this embodiment, separator 201 is shaped substantially as an annulus having inner edge 201a and outer edge 201b. In this embodiment, the annulus is circular, with the inner edge and outer edge being concentric. Although an annulus typically connotes a shape formed by concentric circles, for the purposes of this invention, an annulus is defined as any shape that has an inner and outer edge.

The annular width of separator 201, defined as the radial distance between outer edge 201b and inner edge 201a, must be sufficient to separate coils 104 and 106. For example, if fiber 104 is coiled with a diameter of 5 centimeters, and fiber 106 is coiled with a diameter of 4 centimeters, the separator must have an outer diameter, measured at the outer edge, of at least 5 centimeters. In the case of a circular separator or annulus, radial distances can be measured from the center of the circle. If the separator or annulus is not circular, however, the radial distance can be measured from any point fixed within the inner edge.

Figure 5:
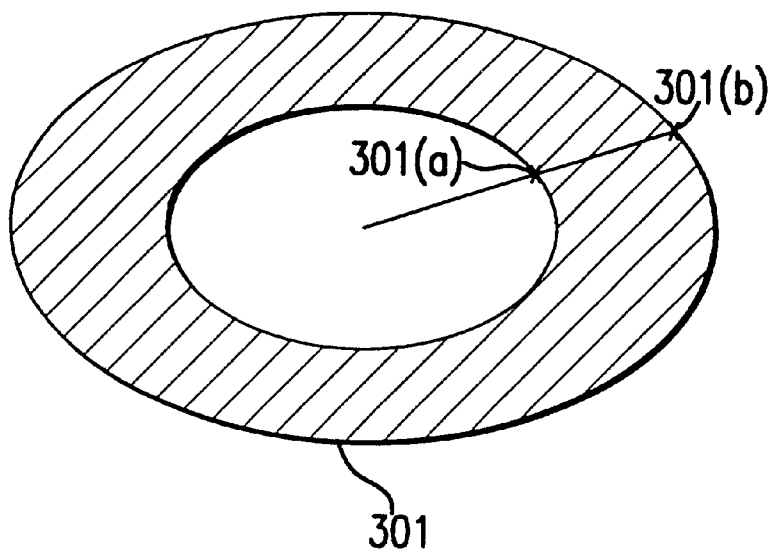
FIG. 5 illustrates a diagram of an apparatus representing another embodiment of the present invention.

FIG. 5 is an illustration of an embodiment of the present invention. In this embodiment, separator 301 is shaped substantially as an annulus having inner edge 301a and outer edge 301b. In this embodiment, the annulus is oval, with inner edge 301a and outer edge 301b being concentric. In this embodiment, as in any non-circular embodiment, the annular width of separator 301 is defined as the distance between inner edge 301a and outer edge 301b, both as measured from some point within inner edge 301a. In FIG. 5, the point inside inner edge 301a happens to be the center of the oval, but any point could have been used to measure the distance.

The tolerances of the gasket are very important to capture the fiber in the bin on the fiber tray. In one embodiment of the present invention, the tolerance of the inner edge is +0.004 inches and −0.000 inches, and the tolerance of the outer edge is +0.000 inches and −0.004 inches.

One material for constructing a separator of any shape is TYVEK™. TYVEK™ is spunbonded olefin, a nonwoven material created by DuPont from 100% high density polyethylene (HDPE). Tyvek is thin, strong, light weight, machines well, and does not collect an undue amount of static electricity. Other materials having properties similar to TYVEK™ can also be used. A thickness of the separator in one embodiment is 0.008 inches.

Functional constraints on the shape of the spool exist, and therefore functional constraints on the shape of the separator exist, based on the properties of optical fibers. In particular, the inner edge of the separator that is to fit snugly over the spool should have a radius of curvature of no less than 3 cm (approximately 1.5 inches). Gaskets can be made to accommodate any radius greater than 3.0 cm so as not to exceed the maximum bend radius, because any bending of fiber below this accepted radius will shorten the life of the fiber, or may adversely affect the propagation characteristics of the optical fiber.

Figure 6:
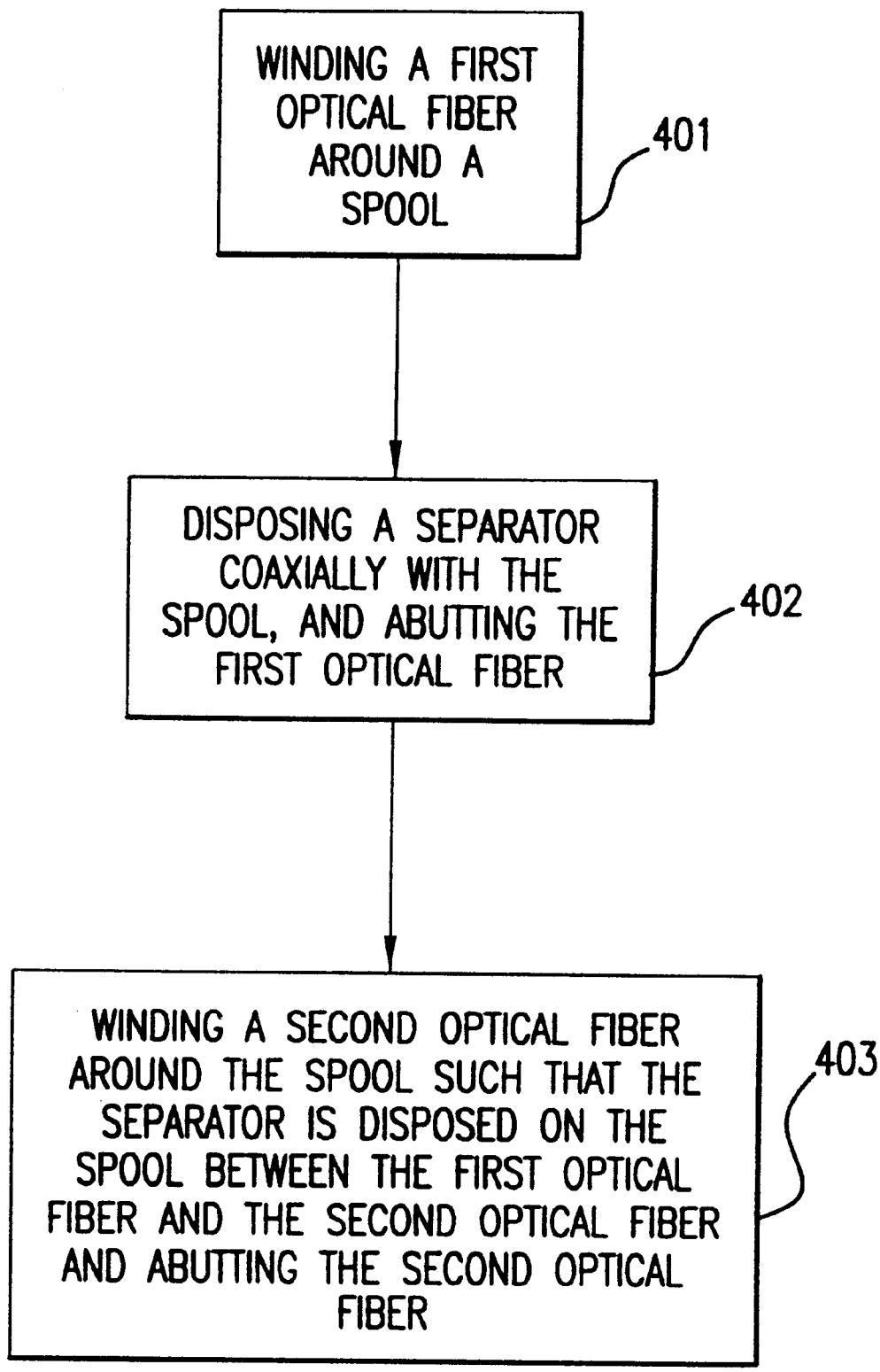
FIG. 6 illustrates a flow chart of an embodiment of the present invention.

FIG. 6 is a flow chart for stacking fiber in accordance with an embodiment of the present invention. First, at step 401, a first optical fiber is wound around the spool. Then, at step 402, the separator is placed coaxially with the spool next to the first optical fiber. At step 403, the second optical fiber is wound around the spool such that the separator is disposed on the spool between the first optical fiber and the second optical fiber. The separator can be fit snugly over the spool to leave little room for the fibers to migrate to the other side of the separator. Also, the second optical fiber can be placed to abut the separator so as to minimize the size spool necessary.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims. For example, materials other than TYVEK™ can be used, and shapes other than circles and ovals can be used, the shape being substantially dictated by the shape of the spool.

What is claimed is:

1. A separator for preventing a first optical fiber and a second optical fiber wound on the same spool from interfering with one another, comprising an annulus, said annulus having an inner edge, an outer edge, and an annular width consisting of the distance, measured radially, between said inner and outer edges, said inner edge of said annulus sized to fit snugly in a coaxial fashion around the spool, and said annular width at least large enough to separate the winding of the first and second optical fiber on the spool.

2. The apparatus of claim 1, wherein the separator is made from material consisting essentially of TYVEK™.

3. The apparatus of claim 2, wherein said inner edge is circular, and said outer edge is circular and concentric with said inner edge.

4. The apparatus of claim 3, wherein said inner edge has a radius of curvature of no less than approximately two inches.

5. A method of separating a first optical fiber from a second optical fiber wound on a single spool, comprising:

(a) winding the first optical fiber around the spool;

(b) placing an annulus coaxially with the spool and abutting the first optical fiber;

(c) winding the second optical fiber around the spool such that the annulus is disposed on the spool between the first optical fiber and the second optical fiber and abutting the second optical fiber.

6. The method of claim 5, wherein the annulus is made from a material consisting essentially of TYVEK™.

7. The method of claim 5, wherein the inner edge is circular, and the outer edge is circular and concentric with the inner edge.

8. The method of claim 5, wherein said inner edge has a radius of curvature of no less than approximately three centimeters.

* * * * *